2 Sheets—Sheet 1.

B. OSGOOD.

CORN HARVESTER.

No. 191,610.

Patented June 5, 1877.

WITNESSES:

A. W. Almqvist

J. H. Scarborough

INVENTOR:

B. Osgood

BY Munn & Co

ATTORNEYS.

N. PETERS, PHOTO-LITHOGRAPHER, WASHINGTON, D. C.

2 Sheets—Sheet 2.

B. OSGOOD.

CORN HARVESTER.

No. 191,610. Patented June 5, 1877.

WITNESSES:

A. W. Almqvist

J. H. Scarborough

INVENTOR:

B. Osgood.

BY Munn & Co

ATTORNEYS.

N. PETERS, PHOTO-LITHOGRAPHER, WASHINGTON, D. C.

UNITED STATES PATENT OFFICE.

BENNETT OSGOOD, OF LENOX, IOWA.

IMPROVEMENT IN CORN-HARVESTERS.

Specification forming part of Letters Patent No. 191,610, dated June 5, 1877; application filed December 4, 1876.

*To all whom it may concern:*

Figure 1:
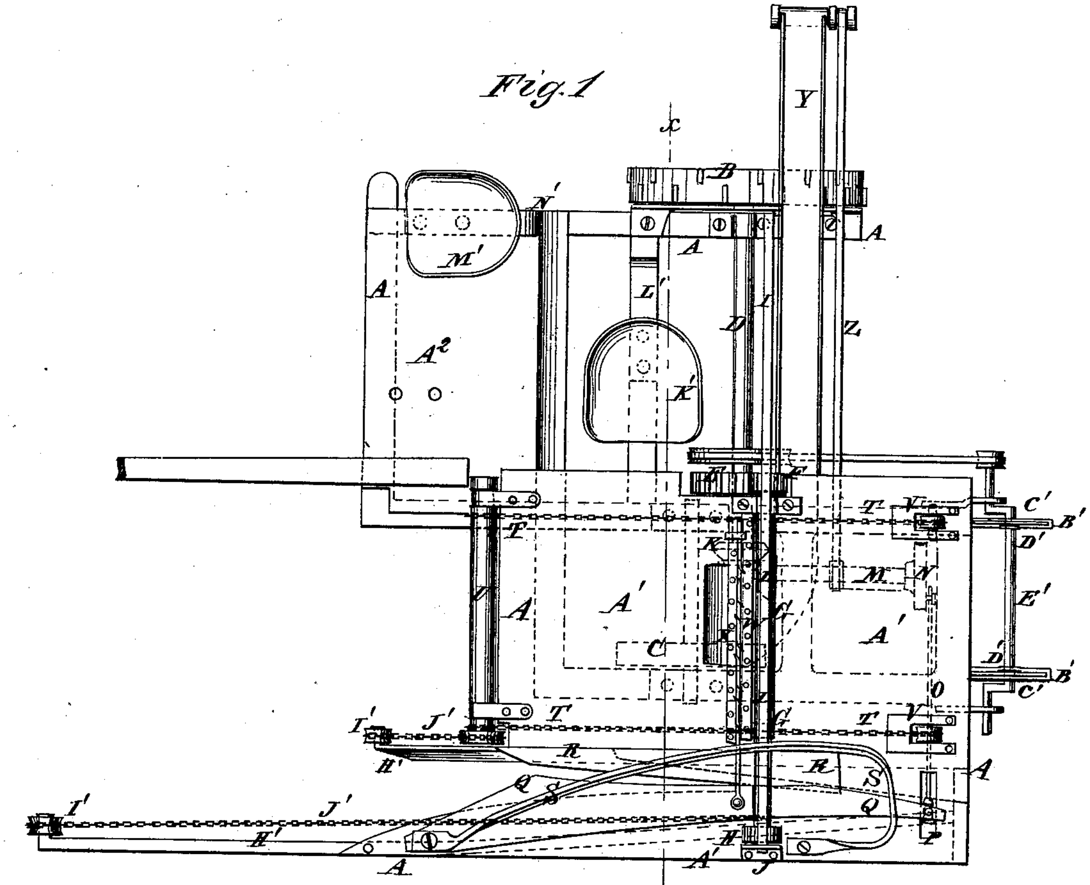
Figure 2:
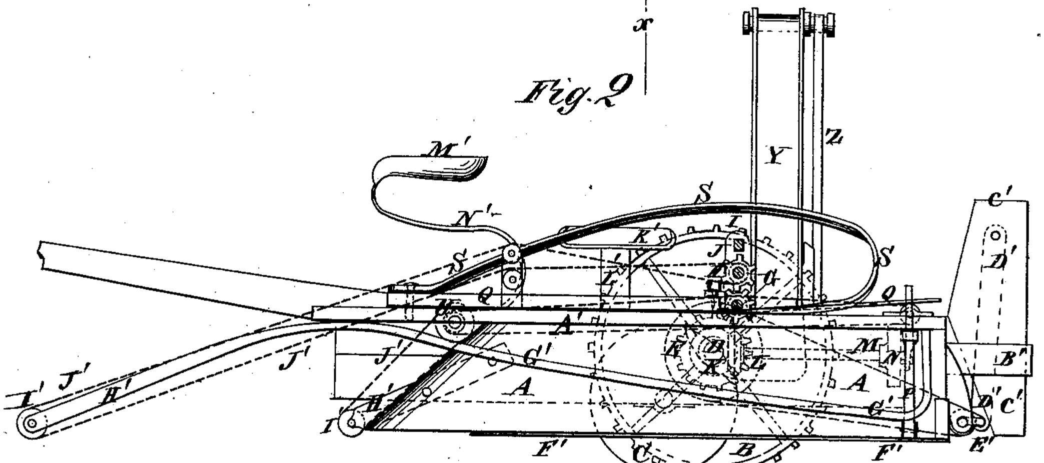
Figure 3:
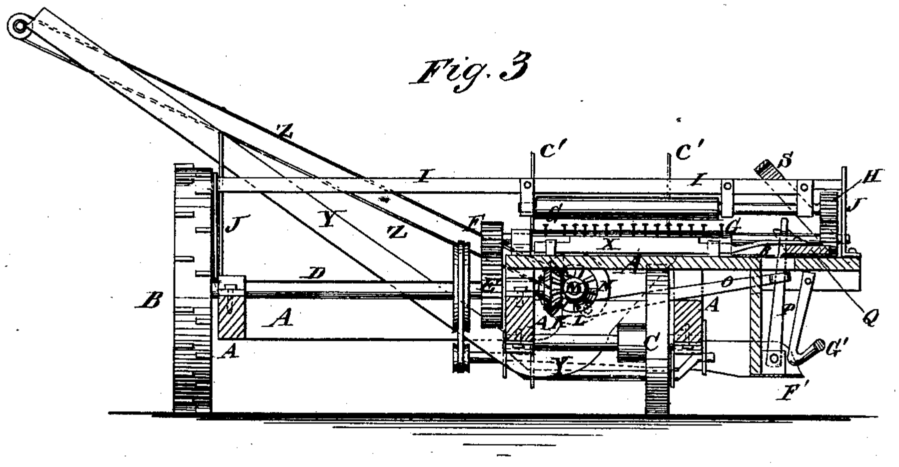
Figure 4:
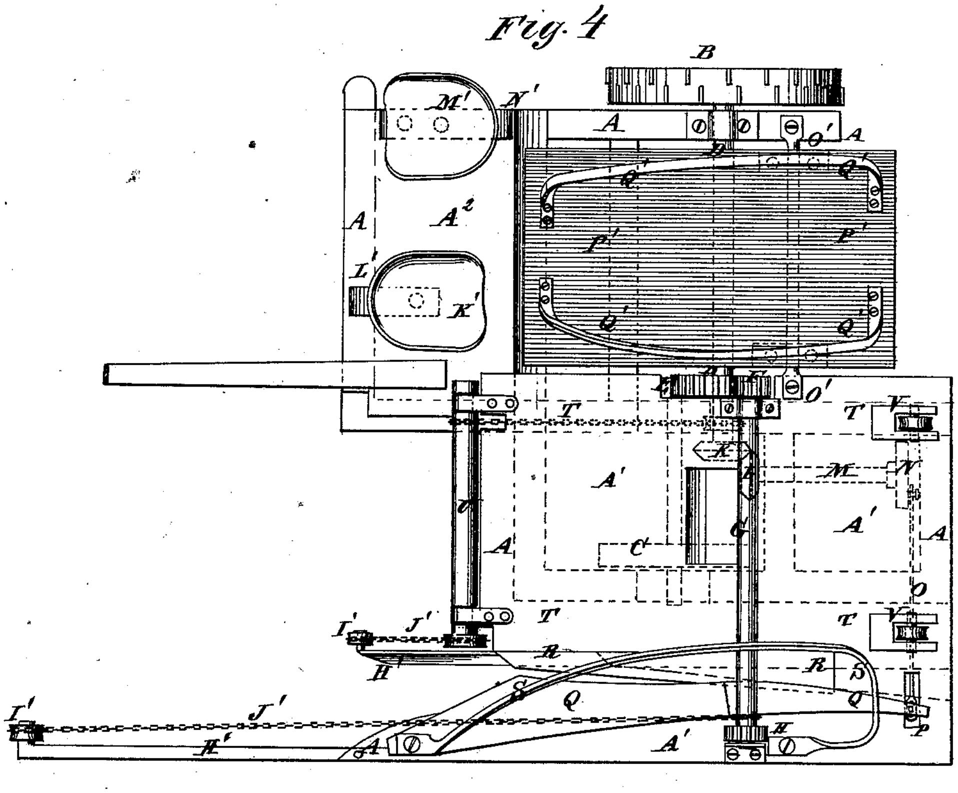

Be it known that I, BENNETT OSGOOD, of Lenox, in the county of Taylor and State of Iowa, have invented a new and useful Improvement in Corn-Harvesters, of which the following is a specification:

Figure 1, Sheet 1, is a top view of my improved machine. Fig. 2, Sheet 1, is a side view of the same. Fig. 3, Sheet 2, is a vertical cross-section of the same, taken through the line *x x*, Fig. 1. Fig. 4, Sheet 2, is a top view of the same, arranged as a shocker.

Similar letters of reference indicate corresponding parts.

The object of this invention is to furnish an improved machine for cutting up the corn, removing the ears from the stalks, and cutting the stalks into pieces, and which may be adjusted to cut up the corn and shock it.

The invention consists in the construction and combination of parts which will be hereinafter more fully described, and then pointed out in the claims.

A represents the frame of the machine. $A^1$ represents the main platform, and $A^2$ the side or driver's platform.

B and C are the wheels upon which the machine is carried. The wheel C is attached to a shaft that revolves in bearings attached to the frame A.

The drive-wheel B is attached to the outer end of a shaft, D, that revolves in bearings attached to the frame A, and to its inner part is attached a large gear-wheel, E, the teeth of which mesh into the teeth of a smaller gear-wheel, F, attached to the inner end of the lower roller G.

The rollers G are placed the one directly above and parallel with the other, and their outer ends are connected by a pair of gear-wheels, H. The lower roller G revolves in bearings attached to the frame A. The upper roller G revolves in bearings attached to the bar I, the ends of which are secured to standards J attached to the side bars of the frame A.

To the inner end of the shaft D is attached a bevel-gear wheel, K, the teeth of which mesh into the teeth of the bevel-gear wheel L attached to the forward end of the shaft M.

The shaft M revolves in bearings attached to the frame A, and to its rear end is attached a crank-wheel, N, to the crank-pin of which is pivoted the end of a connecting-rod, O.

The outer end of the connecting-rod O is slotted to receive or is pivoted to an upright lever, P, the lower end of which is pivoted to a support attached to the side bar of the frame A.

The upper end of the lever P passes up through a cross-slot in the outer rear corner of the main platform $A^1$, and to it is pivoted the rear end of the bar Q, which passes forward beneath the rollers G, and its forward end is pivoted to the outer forward corner of the platform $A^1$.

The bar Q passes along the outer side of a slot in the forward part of the platform $A^1$, so as, by the inward movement of its rear end, to press the corn-stalks against the stationary knife R, attached to the forward part of the platform A along the inner side of its slot. The pivoted bar Q may have a knife attached to its lower side, if desired.

To the forward outer corner of the frame A is attached the forward end of the bar S, which is curved upward and inward, extends to the rearward, is curved outward and downward, and its rear end is attached to the outer rear part of the platform A.

The guide-bar S presses the stalks inward, so that as they are cut by being pressed against the knife R by the bar Q they may fall across the forward part of the platform $A^1$.

The falling stalks are received upon and are carried back by the endless chains T, which pass around the roller U, or around chain-wheels attached to said roller over the lower roller G, or over chain-wheels attached to said roller G, and around pulleys V pivoted in slots in the rear part of the platform $A^1$. The roller U revolves in bearings attached to the forward end of the platform $A^1$.

To the platform $A^1$, directly in front of the rollers G, is securely attached a bar, W, to the upper side of which are attached hooks or headed pins.

Upon the platform $A^1$, at the forward side of the bar W, is placed a bar, X, to the upper side of which are attached hooks or headed pins. The bar X slides longitudinally in keepers attached to the platform $A^1$, and its outer end is connected with the bar Q, so that the movements of the said bar Q may vibrate the said bar X.

By this construction, as the stalks are carried back by the chains T the pins or hooks of the bars X W tear open the husks of the ears, and the bars X W, in connection with the rollers G, break the ears from the stalks.

The ears, when broken off, drop through an opening in the platform $A^1$ into the elevator Y, up which they are carried, and are discharged into a wagon drawn at the side of the machine. The box of the elevator is supported from the frame A of the machine, and its carrier is driven from the shaft M by an endless band, Z.

As the stalks pass the rollers G they are carried back by the endless chains T, and allowed to drop from the rear end of the platform $A^1$ upon the brackets B′ attached to the rear bar of the frame A.

As the stalks fall upon the brackets B′ they are cut into three pieces by the two knives C′, which work in slots in the brackets B′, and to the upper part of which are pivoted the upper ends of two bars, D′. The lower ends of the two bars D′ are pivoted to a crank formed upon the shaft E′, which revolves in bearings attached to the rear bar of the frame A, and which is designed to be revolved from the shaft D by a band.

To the bottom of the frame A, and in such a position as to be struck by the stubble, after the stalks have been cut by the knife R, is secured a stationary knife, F′, against which the said stubble is held by an inclined guide-rod, G′, attached to the frame of the machine.

By this construction the stalks are left upon the ground cut into four pieces, so that they will not interfere with the subsequent plowing of the field.

To the frame of the machine, at the forward ends of the sides of the slot in which the stalks are cut, are attached two arms, H′, which project forward, and to their forward ends are pivoted pulleys I′, around which pass endless chains J′. The inner chain J′ passes around the shaft U, or a pulley attached to the said shaft U. The outer chain J′ passes around one of the rollers G, or a pulley attached to said roller G. The chains J′ are designed to raise bent-down stalks, so that they will enter the slot in the platform A and be cut by the knife R.

K′ is a seat, the standard L′ of which is attached to a cross-bar of the frame A in such a position that the attendant, sitting upon the said seat, can reach the stalks and keep them in proper position as they pass back to the husking device.

M′ is the driver's seat, the standard N′ of which is attached to the outer part of the side platform $A^2$.

When the corn is to be shocked, instead of being husked, the husking-bars W X and the upper roller G are removed. The outer chain T is removed, and the inner chain T is removed from above the platform $A^1$, and is passed down through a slot in the forward edge of the platform $A^1$, and around a pulley upon the shaft D, so as to run the inner chain J′, while the outer chain J′ is run by the lower roller G.

The attendant's seat K′ L′ is removed, and is attached to the platform $A^2$; and to the frame A, a little in the rear of the shaft D, are attached the ends of a rod, O′, to which is pivoted the rear part of the platform P′. The platform P′ rests upon the pivoting-rod O′, a cross-bar of the frame A, and the rear edge of the platform $A^2$.

To the platform P′ are attached the ends of two curved guard-bars, Q′, between which the stalks are laid by an attendant, as they are removed by him from the platform $A^1$. When enough stalks have been placed upon the platform P′ for a shock, their upper ends are bound, and the said platform P′ is tilted, which leaves the shock standing upon the ground.

Having thus described my invention, I claim as new and desire to secure by Letters Patent—

1. The combination of the stationary horizontal knife R, the pivoted bar Q, the pitman O′, and the curved guide-bar S, with the slotted platform $A^1$, for cutting the stalks and throwing them across the said platform, substantially as herein shown and described.

2. The combination of the bars W X, provided with the hooks or headed pins, and the rollers G with the platform $A^1$, for husking the ears as the stalks are carried back by the endless chains T, substantially as herein shown and described.

3. The combination of the slotted brackets B′, the sliding knives C′, the pivoted bars D′, and the crank-shaft E′, with the frame A, for receiving and cutting up the stalks as they fall from the platform $A^1$, substantially as herein shown and described.

BENNETT OSGOOD.

Witnesses:
EDMOND MADDEN,
G. W. BEYMER, Jr.